(12) United States Patent
Raudsepp et al.

(10) Patent No.: US 10,486,256 B2
(45) Date of Patent: Nov. 26, 2019

(54) ARC WELDING METHOD AND ARC WELDING ARRANGEMENT WITH FIRST AND SECOND ELECTRODES

(71) Applicant: ESAB AB, Gothenburg (SE)

(72) Inventors: Hannes Raudsepp, Solna (SE); Vesa Kiiskinen, Lahtis (FI)

(73) Assignee: ESAB AB, Gothenburg (SE)

( * ) Notice: Subject to any disclaimer, the term of this patent is extended or adjusted under 35 U.S.C. 154(b) by 1001 days.

(21) Appl. No.: 14/654,994

(22) PCT Filed: Dec. 20, 2013

(86) PCT No.: PCT/EP2013/077765
§ 371 (c)(1),
(2) Date: Jun. 23, 2015

(87) PCT Pub. No.: WO2014/102202
PCT Pub. Date: Jul. 3, 2014

(65) Prior Publication Data
US 2015/0343550 A1    Dec. 3, 2015

(30) Foreign Application Priority Data
Dec. 28, 2012    (SE) ...................................... 1200792

(51) Int. Cl.
*B23K 9/095*    (2006.01)
*B23K 9/10*    (2006.01)
(Continued)

(52) U.S. Cl.
CPC ............ *B23K 9/095* (2013.01); *B23K 9/1006* (2013.01); *B23K 9/1068* (2013.01); *B23K 9/1081* (2013.01); *B23K 9/123* (2013.01)

(58) Field of Classification Search
CPC .... B23K 9/095; B23K 9/0017; B23K 9/1006; B23K 9/1068; B23K 9/1081; B23K 9/121; B23K 9/123
(Continued)

(56) References Cited

U.S. PATENT DOCUMENTS 2,061,671 A * 11/1936 Riemenschneider ........................
B23K 9/1675
219/124.02
3,751,628 A * 8/1973 Scherl ...................... B23K 9/04
219/137 R
(Continued)

FOREIGN PATENT DOCUMENTS

CN    101116925 A    2/2008
CN    101657287 A    2/2010
(Continued)

OTHER PUBLICATIONS

International Search Report and Written Opinion dated May 20, 2014, for corresponding PCT application, PCT/EP2013/077765 Filed Dec. 20, 2013.
(Continued)

*Primary Examiner* — Tu B Hoang
*Assistant Examiner* — Alba T Rosario-Aponte
(74) *Attorney, Agent, or Firm* — Edell, Shapiro & Finnan, LLC (57) ABSTRACT

The present application relates to an electric arc welding method to be used with an arc welding arrangement (1) comprising a first power source, a first electrode (2) connected to said first power source, and a second electrode (7), said first electrode (2) being adapted to generate a weld pool (28) via a first electric arc present within a first arc region (31) and said second electrode (7) being adapted to generate said weld pool via a second electric arc present within a second arc region. The first electrode (2) is operated at
(Continued)

welding parameters adapted to maintain said first arc ignited. The second electrode (7) is operated at welding parameters adapted to ensure that excess energy from at least said first electrode (2) is required to maintain said second arc ignited. The method comprises the step of feeding said second electrode (7) so that it is allowed to consume excess energy from said first electrode (2) to maintain said second arc ignited. The invention also relates to an arc welding arrangement (1) for carrying out the method.

11 Claims, 7 Drawing Sheets

(51) Int. Cl.
  *B23K 9/12* (2006.01)
  *B23K 9/00* (2006.01)
  *B23K 9/173* (2006.01)
  *B23K 9/18* (2006.01)

(58) Field of Classification Search
  USPC .......... 219/130.1, 130.4, 137 PS, 137.2, 139
  See application file for complete search history.

(56) References Cited

U.S. PATENT DOCUMENTS

| | | | | |
|---|---|---|---|---|
| 2010/0059485 A1* | 3/2010 | Hutchison | ................ | B23K 9/04 219/74 |
| 2013/0200054 A1* | 8/2013 | O'Donnell | ............... | B23K 9/09 219/130.1 |
| 2015/0202709 A1* | 7/2015 | Raudsepp | .............. | B23K 9/121 219/73 |
| 2015/0336198 A1* | 11/2015 | Raudsepp | ............ | B23K 9/0017 219/130.1 |

FOREIGN PATENT DOCUMENTS

| | | | |
|---|---|---|---|
| CN | 101745726 | A | 6/2010 |
| CN | 102325625 | A | 1/2012 |
| CN | 102387889 | A | 3/2012 |
| GB | 898151 | A | 6/1962 |
| JP | S63-313674 | A | 12/1988 |
| JP | H02-205267 | A | 8/1990 |
| JP | 2002-219571 | A | 8/2002 |
| JP | 2003053545 | A | 2/2003 |
| WO | 20121041375 | A1 | 4/2012 |
| WO | 2013/091729 | A1 | 6/2013 |

OTHER PUBLICATIONS

First Chinese Office Action in corresponding Chinese Application No. 201380022579.5 dated Sep. 30, 2016, 10 pages.
Second Chinese Office Action in corresponding Chinese Application No. 201380022579.5 dated Feb. 27, 2017, 9 pages.
Communication pursuant to Article 94(3) EPC for European Patent Application No. 13 814 856.2, dated Sep. 14, 2016, 4 pages.
Office Action for Brazilian Patent Application No. BR112015015276-7 dated Mar. 1, 2019, 7 pages.

* cited by examiner

ARC WELDING METHOD AND ARC WELDING ARRANGEMENT WITH FIRST AND SECOND ELECTRODES

TECHNICAL FIELD

The present invention relates to a method for electric arc welding. In particular the present invention relates to a method for electric arc welding according to the preamble of claim 1, where welding takes place by a welding head having at least two contact devices, each being connected to a respective electrode and a respective power source to enable arc ignition between the electrodes and a work piece. The present invention also relates to an arrangement for carrying out said method.

BACKGROUND OF THE INVENTION

Electric arc welding with continuously fed electrodes is performed with various techniques. These techniques comprise submerged arc welding, where welding is performed under a protective layer of flux, and gas metal arc welding where welding is performed under a protective gas shield.

In order to increase the productivity it has been suggested to use more than one electrode in the welding process. Known such welding processes are tandem and twin welding methods, which are used to increase the production rate when welding.

Tandem welding is a welding technology where two independent electrodes are arranged to perform welding in a common weld pool.

Each of the two electrodes are connected to a separate power source such that the welding conditions comprising current and voltage can be controlled independently for the electrodes. The electrodes can be mounted in various settings, such as for instance with the electrodes positioned shifted out in a transverse direction with respect to a welding direction or being positioned at a distance from each other in the welding direction. In the event the electrodes are shifted out in the transverse direction, they may be positioned side by side. This is used for surface welding or specific joints where a wide joint is needed. Side by side welding leads to lower penetration and more width.

Alternatively the electrodes are positioned at a distance from each other in the welding direction. In this event, the first electrode in the direction of welding is normally referred to as a leading electrode, while the second electrode is normally referred to as a trailing electrode. Normally the leading electrode and the trailing electrodes serve different roles in the welding process. It is for instance known to control the leading electrode such that a desired degree of penetration is obtained, while the trailing electrode controls weld bead appearance, contour and fill.

Tandem welding enables increased deposition rates and therefore improves economy of welding. Tandem welding also enables improved weld quality due to the possibility of assigning the leading and trailing electrode different tasks. In order to allow the different electrodes to be assigned different tasks the electrodes should preferably be sufficiently close to enable both electrodes to operate in a common single weld pool. In the event the electrodes are separated too far from each other, the weld pool generated by the leading electrode may solidify before the trailing electrode has reached the puddle. In this event, the two electrodes more or less perform the task of two consecutive welding passes.

Twin welding is similar to tandem welding, with the difference that the electrodes are connected to the same power source.

Another way to improve the deposition rate is to add one or more consumable electrodes that melt without formation of arcs. These electrodes are sometimes referred to as cold wires, whereas electrodes arranged to generate arcs are referred to as hot wires. A cold wire is continuously fed into the arcs of one or more hot wires, where the cold wire is melted by excess energy generated by said hot wire(s). A current may be transferred through a portion of a cold wire for heating thereof.

The introduction of cold wire material into the weld pool may lead to improved control of the composition of the weld alloy, which may lead to improved welds. Feeding of cold wire material into the weld pool may lead to an increase in productivity of up to 100% with optimized welding parameters. In other words, a cold wire allows for higher deposition rates without increasing the heat input.

A problem associated with cold wires is that they sometimes increase the welding process instability when the cold wire is not melted at an even pace. The may also strike the parent material through the melt pool. This can cause weld defects and inclusions in the weld metal of unmelted cold wire material. Also, the amount of cold wire that can be added to the weld pool is limited by the amount of excess energy generated by the hot wires.

It is a first object of the invention is to provide an efficient electric arc welding method, which makes possible an increased production rate.

A second object of the invention is to provide an electric arc welding arrangement, which makes possible an increased production rate and more efficient welding.

SUMMARY OF THE INVENTION

The first object of the invention is achieved with an electric arc welding method to be used with a welding arrangement. The welding arrangement comprises a first power source, a first wire feeder for feeding a first electrode and a second wire feeder for feeding a second electrode. The welding arrangement further comprises an electric arc welding head comprising a first contact device housing a first duct for guiding the first electrode and providing electrical contact between said first power source and said first electrode and a second contact device housing a second duct for guiding the second electrode and providing electrical contact between said a power source and said second electrode. The first and second contact devices are electrically insulated from each other. The first electrode is adapted to act on a work piece for generating a weld pool via a first electric arc present between the first electrode and the work piece within a first arc region and said second electrode is adapted to act on said work piece for generating said weld pool via a second electric arc present between the second electrode and the work piece within a second arc region. The thus generated heat will assist in melting the electrode material and the thus generated magnetic fields will assist in metal transfer from the electrodes to the weld pool.

The first electrode is operated at welding parameters which maintain said first arc ignited and transfer molten electrode material from said first electrode to said weld pool. That is, the welding parameters of the first electrode are such that the first power source alone can maintain an arc ignited and transfer molten electrode material from the first electrode to the weld pool. The second electrode is operated at welding parameters which ensure that excess energy from at least said first electrode is required to maintain said second arc ignited and transfer molten electrode material from said second electrode to said weld pool.

The method comprises the step of feeding said second electrode into or in the vicinity of the first arc region to allow said second electrode to consume excess energy from the first electrode to ignite and maintain said second arc and transfer molten electrode material from said second electrode to said weld pool. The welding parameters of the second electrode are such that the power from the power source and the consumed excess energy from the first electrode together are sufficient to ignite and maintain an arc between the second electrode and the work piece, melt a portion of the second electrode and transfer molten electrode material from said second electrode to the weld pool. To put it another way, the second electrode is operated with welding parameters which ensure that the power received directly from the second power source is insufficient to ignite an arc between the second electrode and the work piece. Of course, small amounts of molten metal may be inadvertently and uncontrollably transferred from said second electrode to said weld pool. The transfer of excess energy from the first electrode to the second electrode makes it possible to increase the deposition rate with a minimal energy input from the second power source. This allows for an increased production rate, since a welding process is normally limited by a desire to keep the energy input at an acceptable level (too much energy input will destroy the work piece to be welded).

The second electrode is a semi-hot wire. A semi-hot wire is different from a hot wire in that it is not on its own capable of generating an arc and transferring melted electrode material to the work piece, because the electrode is controlled with welding parameters which limit the amount of energy transferred to the semi-hot wire from the corresponding power source. A semi-hot wire is different from a (preheated) cold wire in that the semi-hot wire is arranged to receive and transfer welding current to the work piece whereas a preheated cold wire is connected to lines adapted to transfer an electrode heating current away from the cold wire. The transfer of welding current to the work piece is accomplished by placing the semi-hot wire in the vicinity of a hot wire, so that the semi-hot wire can absorb excess energy from said hot wire to generate an arc and initiate metal transfer to the work piece.

Metal transfer may take place in a short circuit process, in a globular process, in a spray arc process and in submerged arc welding.

The second electrode is advantageously fed into the first arc region, to ensure that it consumes excess energy from the first electrode.

Optionally, the electric arc welding head comprises a third contact device housing a third duct for guiding a third electrode and providing electrical contact between a power source and said third electrode. The third electrode is adapted to act on said work piece for generation of said weld pool via a third electric arc present between the third electrode and the work piece within a third arc region. The first and third electrodes are fed forward so that said first and third arc regions create an overlapping region. The third electrode may be operated at welding parameters which maintain a third arc ignited and transfer molten metal from said third electrode to said weld pool. The method may comprise the step of feeding the second electrode in the vicinity of or into the overlapping region of the first and third arc regions to allow the second electrode to consume excess energy from the first and third electrodes to ignite and maintain said second arc ignited and transfer molten electrode material from the second electrode to the weld pool.

In one embodiment, the first and third electrodes generate arc regions of identical size and cone shape. The electrodes are fed in such a way that the distance between their end portion center axes is less than a cone diameter of an arc cone generated by one of said electrodes and measured at the surface of the weld pool.

The second electrode is advantageously fed into the overlapping region of the first and third arc regions, to ensure that the second electrode will consume excess energy from said first and third electrodes.

This solution involving a third hot wire allows the second electrode to consume excess energy from said first and third electrodes. A suitable electrode arrangement for this purpose is to position the second electrode in between the first and third electrodes.

The first and second electrodes may be powered by the same power source. Alternatively, the first and second electrodes may be powered by different power sources.

The first, second and third electrodes may be powered by the same power source. Alternatively, the first and second electrodes may be powered by one power source and the third electrodes by a different power source. It is also possible to power the first and third electrodes with the same power source and to power the second electrode with a different power source. Finally, it is possible to let the first, second and third electrodes be powered by different power sources.

The third electrode may also be operated with welding parameters that ensure that excess energy from at least one additional electrode is required to maintain said third arc ignited and transfer molten electrode material from said third electrode to said weld pool. In this embodiment the method comprises the step of feeding said third electrode in the vicinity of, or preferably into, said first arc region to ignite and maintain said third arc and transfer molten electrode material from said third electrode to said weld pool. In this embodiment the third duct is isolated from at least the first duct. That is, a welding arrangement may comprise any number of hot and semi-hot wires. A semi-hot wire can consume excess energy from more than one hot wire and a hot wire may provide excess energy to more than one semi-hot wire.

At least two and preferably all three of the first, second and third ducts are fed in parallel to ensure that the end portions of said electrodes are arranged in parallel.

The first and third electrodes may be fed in a first plane and the second electrode in a second plane, which is orthogonal to the first plane. This enables a symmetric position of the second electrode in relation to the first and third electrodes. A symmetric positioning of the second electrode with respect to the first and third electrodes allows for more stable arc plasma conditions at the location of the second electrode. Thus a more stable deposition rate of the second electrode can be achieved. Alternatively, the first, second and third electrodes are all fed in a first plane.

Advantageously, the end portion of a semi-hot electrode is fed in between the end portions of the two or more hot wires. This allows the semi-hot electrode to consume excess energy from more than one hot wire.

Advantageously, the end portion of a hot wire is fed in between two semi-hot electrodes. The semi-hot wires are preferably located on opposite sides of the hot wire. This allows the hot wire to transfer excess energy to more than one semi-hot wire. The result is a more energy efficient solution. The hot wire may have a relatively large diameter in comparison to the second and third electrodes.

Optionally, the wire feed speed of the second wire feeder is controlled in dependence on one or more welding parameters of at least one hot wire. This is advantageous in that the welding parameters of the hot wire determines the magnitude of the excess energy available to assist in the melting of the second electrode and thus at which wire feed speed the second electrode can be fed towards the work piece. The second electrode is advantageously fed at a wire feed speed of between 0.2 and 0.9, more preferably 0.6 and 0.8, of the power feed speed $w_{max}$, wherein $w_{max}$ is the wire feed speed at which the excess energy consumed by the second electrode corresponds to the energy needed (in addition to the power generated by the second power source) for igniting an arc at the second electrode.

It is advantageous to keep the ratio between the input power to wire feed volume much higher for the electrode at which transfer of molten material would take place even without excess energy from a neighboring electrode than the ratio for the electrode at which transfer of molten material would not occur. In this way, it is ensured that the heat input can be kept at a low level and that high production rates can be achieved.

The invention contemplates the use of welding parameters for the second electrode which comprise current, voltage and wire feed speed, wherein the current, voltage and wire feed speed for the second electrode are selectable independently of each other.

The invention further contemplates use of welding parameters for the first electrode comprising current, voltage and wire feed speed. The current and the voltage may be set parameters and the wire feed speed a result parameter selected to enable a stable arc. Alternatively, the wire feed speed may be a set parameter and the current automatically adjusted to maintain an arc voltage level. The welding current may also remain essentially constant whereas the arc voltage is dependent on the rate at which the hot wire is fed towards the work piece.

The second object of the invention is achieved with an arc welding arrangement for carrying out the above described method. The arc welding arrangement comprises a first power source, a first wire feeder for feeding a first electrode and a second wire feeder for feeding a second electrode. The arc welding arrangement further comprises an electric arc welding head comprising a first contact device housing a first duct for guiding the first electrode and providing electrical contact between said first power source and said first electrode, a second contact device housing a second duct for guiding the second electrode and providing electrical contact between a second power source and said second electrode. The first and second contact devices are electrically insulated from each other, said first electrode being adapted to act on a work piece for generating a weld pool via a first electric arc present between the first electrode and the work piece within a first arc region and said second electrode being adapted to act on said work piece for generating said weld pool via a second electric arc present between the second electrode and the work piece within a second arc region.

The first electrode is arranged to be operated at welding parameters which maintain said first arc ignited and transfers molten electrode material from said first electrode to said weld pool. That is, the first electrode does not require excess energy from other electrodes to generate said arc.

The second electrode is arranged to be operated at welding parameters which ensure that excess energy from at least one additional electrode is required to maintain said second arc ignited and transfer molten electrode material from said second electrode to said work piece.

The first and second ducts are arranged such that said second electrode is fed in the vicinity of or into the vicinity of said first arc region to allow said second electrode to consume excess energy from said first electrode to ignite and maintain said second arc ignited and transfer molten electrode material from said second electrode to said weld pool.

Advantageously, the first and second ducts are arranged such that said second electrode can be fed into said first arc region. That is, the distance between the center axis of the first duct and the center axis of the second duct should not exceed half the diameter of an arc cone generated by the first electrode and measured at the surface of the weld pool.

In an alternative embodiment, it may be sufficient to arrange the first and second ducts such that the first and second arc regions at least partially overlap.

The distance between the center axis of the end portion of the first electrode and the center axis of the end portion of the second electrode required to allow said second electrode to consume excess energy from said first electrode depends on a plurality of factors, for example wire dimension, wire material, stick-out, current, voltage, process mode (CA, CW, CC), frequency and welding speed.

The first arc generates a substantial amount of energy while the second electrode absorbs excess energy from the first electrode and thus increases the deposition rate with a minimal energy input. This allows for an increased production rate, since a welding process is normally limited by a desire to keep the energy input at an acceptable level, and a more energy efficient welding procedure.

The arc welding head may comprise a third contact device housing a third duct for guiding a third electrode and providing electrical contact between a power source and said third electrode. The third electrode is adapted to act on the work piece for generating said weld pool via a third electric arc present between said third electrode and said work piece within a third arc region, wherein said first and third ducts are arranged to allow said first and third arc regions to have an overlapping region. The third electrode is adapted to be operated at welding parameters which maintain a third arc ignited and transfer molten metal from said third electrode to said weld pool. The second duct is arranged to allow said second electrode to be fed in the vicinity of or into said overlapping region of the first and third arc regions to consume excess energy from the first and third electrodes to ignite and transfer molten electrode material from the second electrode to said weld pool.

Advantageously, the second first, second and third ducts are arranged such that the second electrode is fed into the overlapping region of the first and third arc regions. This would ensure that the second electrode can consume excess energy from more than one electrode and may thus provide a more stable welding procedure, as the second arc can be maintained also when one of the first and third arcs is extinguished.

Alternatively, the arc welding head may comprise a third contact device housing a third duct for guiding the third electrode and providing electrical contact between a power and said third electrode. The third electrode is adapted to act on said work piece for generating said weld pool via a third electric arc present between the third electrode and the work piece within a third arc region. The third electrode is adapted to be operated at welding parameters, which ensure that the third electrode must consume excess energy from at least one additional electrode to maintain said third arc ignited and transfer molten electrode material to said weld pool. The first and third ducts are arranged such that said third electrode is allowed to be fed into or in the vicinity of the first arc region to allow said third electrode to consume excess energy from said first power electrode to ignite and maintain said third arc and transfer molten electrode material from said third electrode to said weld pool.

Advantageously, the first and third ducts are arranged such that the third electrode can be fed into the first arc area. It is in any case arranged such that the third electrode can be brought close enough to the first electrode to absorb excess energy from said first electrode.

Advantageously, the first, second and third ducts are arranged on opposite sides of the first duct, to ensure that the end portions of the second and third electrodes during welding are located on opposite sides of the first duct. This is particularly the case in embodiments wherein both the second and third electrodes are adapted to consume excess energy from the first electrode.

The second duct may also be located in between said first and third ducts. This is advantageous in that the second electrode may consume energy from said first and third electrodes.

In some embodiments, at least two of said first, second and third ducts are arranged in parallel.

In some embodiments, the first and third ducts are arranged in a first plane and the second duct in a second plane, which is orthogonal to the first plane. This enables a symmetric position of the second electrode in relation to the first and third electrodes. A symmetric positioning of the second electrode with respect to the first and third electrodes allows for more stable arc plasma conditions at the location of the second electrode. Thus a more stable deposition rate of the second electrode can be achieved. Alternatively, the first, second and third ducts are all arranged in a first plane.

Advantageously, the welding arrangement comprises a controller adapted to control one or more of the wire feeding means and the power sources.

In one embodiment, the controller is connected to a wire feeder arranged to feed a semi-hot electrode. The controller may be adapted to control the wire feed speed of the semi-hot electrode in dependence on welding parameters of at least one hot wire adapted to provide excess energy to said semi-hot electrode. That is, the wire feed speed of the semi-hot electrode is not dependent on the current or voltage applied to the semi-hot electrode. For example, the second wire feeder may be controlled in dependence on welding parameters of the first and/or third power electrodes.

The controller may also be adapted to control the wire feed speed of the wire feeder arranged to feed the semi-hot electrode in dependence on the wire feed speed of at least one wire feeder arranged to feed an electrode arranged to provide excess energy to said semi-hot electrode. For example, the wire feed speed of the second wire feeder may be controlled in dependence on the wire feed speed(s) of the first and/or third wire feeder An electrode that must consume excess energy from at least one adjacent electrode to generate an arc may be adapted to have a wire feed speed higher than the wire feed speed of the electrode adapted to provide said excess energy.

The welding parameters for a semi-hot wire may comprise current, voltage and wire feed speed. The current, voltage and wire feed speed for the semi-hot electrode can be selectable independently of each other.

The welding parameters for a hot wire may comprise current, voltage and wire feed speed. The current and the voltage may be set parameters and the wire feed speed a result parameter selected to enable a stable arc. Alternatively, the wire feed speed may be a set parameter and the current automatically adjusted to maintain an arc voltage level. The welding current may also remain essentially constant whereas the arc voltage is dependent on the rate at which the hot wire is fed towards the work piece.

BRIEF DESCRIPTION OF DRAWINGS

The invention will now be described in further detail with reference to the appended drawings, wherein.

DETAILED DESCRIPTION OF INVENTION

Figures 1, 2:
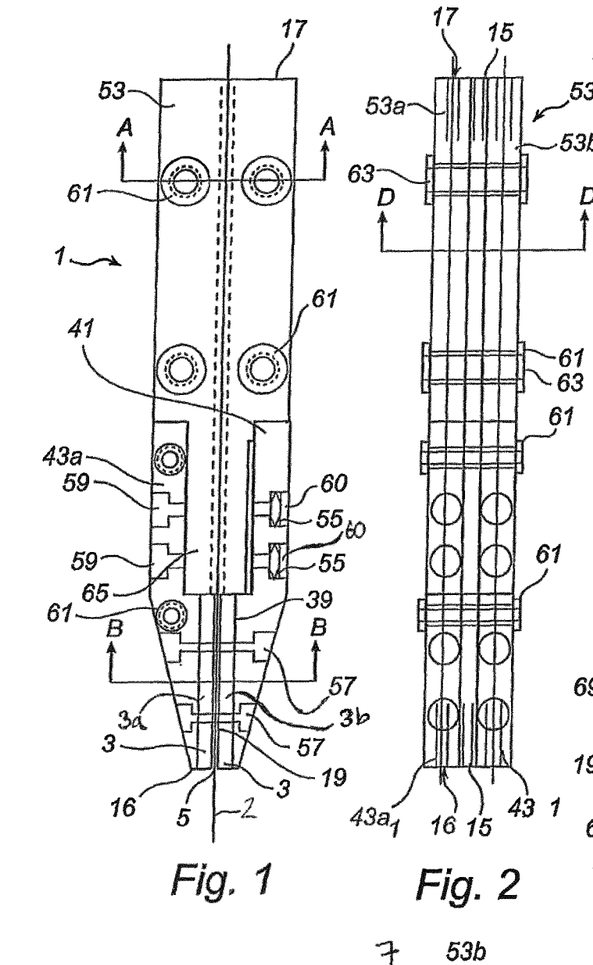
FIG. 1 shows a front view of a welding head according to the invention.
FIG. 2 shows a side view of an embodiment of the welding head in FIG. 1.
Figure 4A:
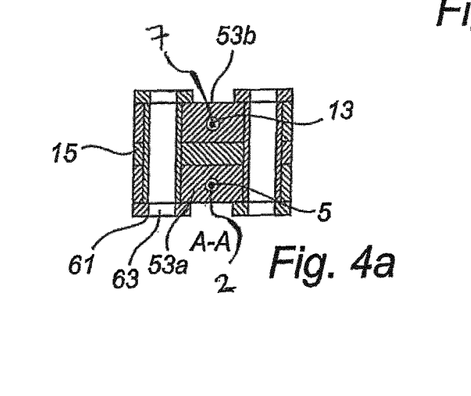
FIG. 4a, b show cross-sections taken at A-A and B-B in FIG. 1 of the embodiment also shown in FIG. 2.
Figure 4B:
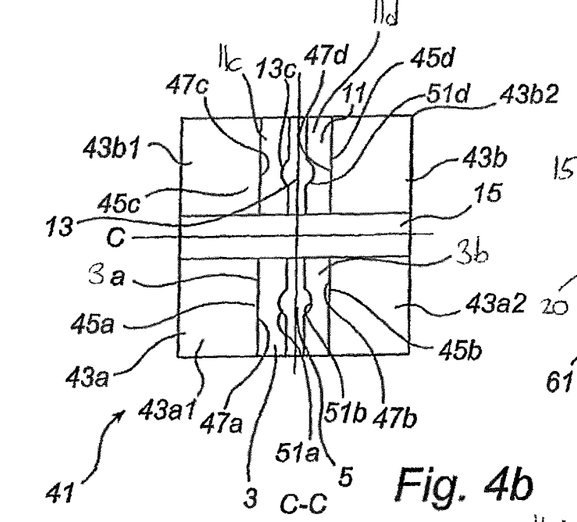

A first embodiment of an arc electric welding head according to the invention is shown in FIGS. 1 and 4a, b.

FIG. 1 shows a front view of an electric arc welding head 1. A front view is a view toward the welding head in a direction opposite to a welding direction. The welding direction is the direction in which the welding head or one or more electrodes are moved during welding. The arc welding head 1 in FIG. 1 comprises a first contact device 3 housing a first duct 5 for feeding a first electrode 2 and providing electrical contact between a first power source (not shown) and the first electrode 2.

FIGS. 4a, b show cross sections taken at A-A and B-B in FIG. 1, respectively. As evident from FIGS. 4a, b, a second contact device 11 is positioned behind the first contact device 3 in the arc welding head 1. The second contact device 11 is housing a second duct 13 for feeding a second electrode 7 and providing electrical contact between a second power source (not shown) and said second electrode 7. The first and second contact devices 3, 11 are electrically insulated from each other by means of an insulating body 15.

The ducts 5, 13 for the first and second electrodes 2, 7 have the same diameter. The first and second electrodes 2, 7 also have the same diameter. In alternative embodiments, the ducts 5, 13 and the electrodes 2, 7 may have different diameters; for example, the diameter of the first electrode 2 may be larger than the diameter of the second electrode 7.

The first and second contact devices 3, 11 are retained in a recess 39 in a retainer 41. As shown in FIG. 4b the retainer 41 comprises a first and a second retainer element 43a, 43b. The first retainer element 43a comprises a first part 43a1 having a jaw portion for securing a first contact plate 3a (part of the first contact device 3) and an attachment portion for securing the first part 43a1 to a carrier 53 (FIG. 1). The first retainer element 43a also comprises a second part 43a2 having a jaw portion for securing a second contact plate 3b (part of the first contact device 3) and an attachment portion for securing the second part 43a2 to said carrier 53.

The first retainer element 43a has first and second wall portions 45a, 45b facing the first and second contact plates 3a, b, respectively. The first wall portion 45a is arranged in abutment with horizontal wall portion 47a of the first contact plate 3a and the second wall portion 45b is arranged in abutment with horizontal wall portion 47b of the second contact plate 3b.

Likewise, the second retainer element 43b comprises a first part 43b1 having a jaw portion for securing a first contact plate 11c (part of the second contact device 11) and an attachment portion for securing the first part 43b1 to said carrier 53. The second retainer element 43b also comprises a second part 43b2 having a jaw portion for securing a second contact plate 11d (part of the second contact device) and an attachment portion for securing the second part 43b2 to said carrier 53.

The second retainer element 43b has a first wall portion and a second wall portion 45c, 45d facing the first and second contact plates 11c, d, respectively. The first wall portion 45c is arranged in abutment with horizontal wall portion 47c of the first contact plate 11c and the second wall portion 45d is arranged in abutment with horizontal wall portion 47d of the second contact plate 11d.

The first contact device 3 comprises the first contact plate 3a, which may be constituted by an essentially rectangular plate having a longitudinally extending recess 51a that forms a portion of the duct 5 for the first electrode 2. The first contact device 3 also comprises the second contact plate 3b, which may be constituted by an essentially rectangular plate having a longitudinally extending recess 51b, which is a portion of the duct 5 for the first electrode 2.

In the same manner, the second contact device 11 comprises the first contact plate 11c, which may be constituted by an essentially rectangular plate having a longitudinally extending recess 51c that forms a portion of the duct 13 for the second electrode 7. The second contact device 11 also comprises the second contact plate 11d, which may be constituted by an essentially rectangular plate having a longitudinally extending recess 51d, which is a portion of the duct 13 for the second electrode 7.

The first and second contact plates 3a, b of the first contact device 3 may be biased against each other by spring action. The first and second contact plates 11c, d of the second contact device 11 may be biased against each other by spring action.

The first retainer element 43a and the first contact device 3 with its first and second contact plates 3a, b are shown at a front side of the welding head 1 (FIG. 1). The first and second contact plates 3a, b are separated by a gap such that an electrode 2 may be interposed in a space there between and secured in a longitudinally extending recess. The first and second parts 43a1, 43a2 of the first retainer element 43a are arranged to be movable with respect to each other such that the gap between the first and second contact plates can be made larger or narrower. Springs 55 are arranged to control a force between the contact plates 3a, b and the electrode 2 positioned in between the contact plates 3a, b.

The contact plates 3a, b are secured to a respective first and second part 43a1, 43a2 by means of screws 57. The first part is secured to the carrier 53 by screws 59. The second part is secured to the carrier 53 by screws 60 having resilient means in the form of springs 55 such that the contact plates 3a, b can be biased against each other.

The second retainer element 43b and the second contact device 11 with its first and second contact plates 11c, 11d are located at a back side of the welding head 1. The first and second contact plates 11c, 11d are separated by a gap such that an electrode 7 may be interposed in a space there between and secured in a longitudinally extending recess. The first and second parts 43b1, 43b2 of the second retainer element 43b are arranged to be movable with respect to each other such that the gap between the first and second contact plates 11c, 11d can be made larger or narrower. Springs are arranged to control a force between the contact plates and a wire electrode 7 positioned in between the contact plates 11c, d.

Now referring to FIG. 4b, the first and second retainer elements 43a, 43b and the first and second contact devices 3, 11 are separated by the insulating body 15 such that on one side of the insulating body 15 are located the first part 43a1 of the first retaining element 43a carrying the first contact plate 3a and the second part 43a2 of the first retaining element 43a carrying the second contact plate 3b, and on the other side of the insulating body 15 are located the first part 43b1 of the second retaining element 43b carrying the first contact plate 11c and the second part 43b2 of the second retaining element 43b carrying the second contact plate 11d.

The first and second parts 43a1, 43a2, 43b1, 43b2 of the first and second retaining elements 43a, 43b are attached to the carrier 53 at a nose portion 65 of the carrier 53.

FIG. 2 is a side view of an embodiment of the welding head 1 shown in FIG. 1. The welding head 1 in FIG. 2 is arranged to receive two electrodes 2, 7. As is evident from FIG. 2, an insulating body 15 extends through the welding head 1 to separate the welding head 1 into first and second halves. The first half comprises the first retainer element 43a and the first and second contact plates 3a, 3b connected to the first retainer element 43a. The second half comprises the second retainer element 43b and the first and second contact plates 11c, 11d connected to the second retainer element 43b.

The carrier 53 is likewise separated into two halves 53a, 53b which are electrically insulated from each other by the insulating body 15. A single insulating body 15 separating the carrier halves 53a, 53b as well as the first and second retainer elements 43a, 43b can be used. Alternatively, a plurality of insulating bodies can be used to form the insulating layer between the two halves 53a, 53b. The two halves 53a, 53b are connected together by insulated connections 61. The insulated connections 61 can be formed by a pipe of insulating material. A screw 63 may be extending through an insulating pipe to secure the two halves 53a, 53b and the insulating body 15 together.

As shown in FIG. 4a, the carrier 53 is formed by a first and a second plate 53a, b with an insulating body 15 interposed in between. The first and second plates 53a, b are secured to each other via an insulating connection 61. The insulating connection 61 may be formed by a pipe of insulating material extending through the first and second plates 53a, b. A screw 63 extends through the pipe of insulating material.

Referring to FIGS. 1 and 2, the carrier 53 may have a nose portion 65. The first and second retainer elements 43a, 43b are attached to the nose portion 65. The first and second retainer elements 43a, 43b are separated by the insulating body 15. The first and second retainer elements 43a, 43b are connected via an insulating element 61. This insulating element 61 may be formed by an insulating pipe through which a screw 63 may extend. Preferably insulating washers of insulating material are used to insulate the side walls of the welding head 1 from the screws.

Figure 3:
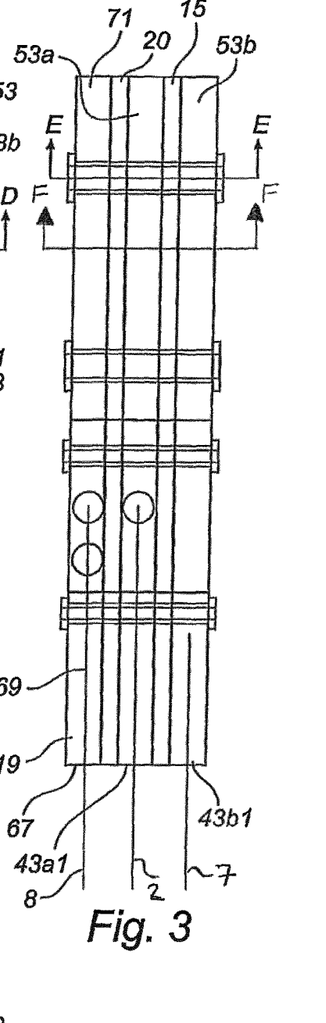
FIG. 3 shows a side view of another embodiment of the welding head in FIG. 1.
Figure 4C:
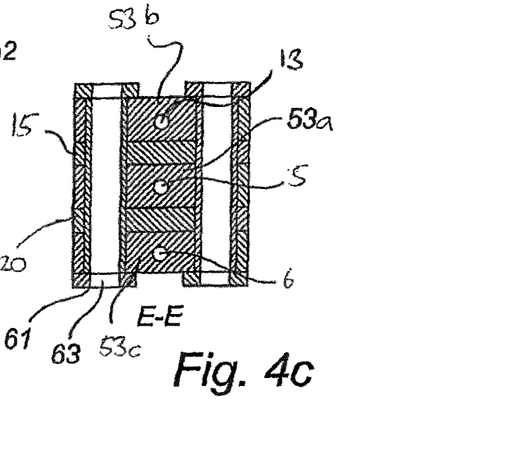
FIG. 4c, d show cross-sections taken at A-A and B-B in FIG. 1 of the embodiment also shown in FIG. 3.
Figure 4D:
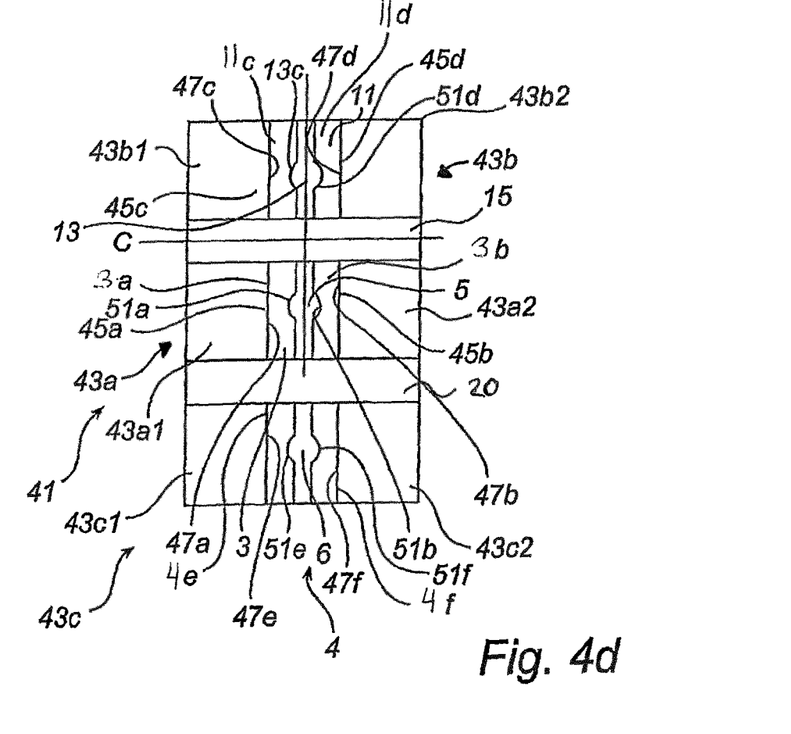

FIGS. 3 and 4*c*, 4*d* show an embodiment of a welding head 1 as shown in FIG. 1 having three electrodes 2, 7, 8, which welding head 1 is arranged 1 to house a central continuously fed electrode 2 and two peripheral continuously fed electrodes 7, 8. The welding head 1 in FIG. 3 is thus based on a welding head 1 as shown in FIGS. 1 and 2 with an additional third contact device 4 housing a third duct 6 for feeding a third electrode 8 and providing electrical contact between a power source (not shown) and the third electrode 8. The first and third contact devices 3, 4 are electrically insulated from each other by an insulating body 20.

The ducts 5, 6, 13 for the first, second and third electrodes 2, 7, 8 may have the same diameter and house electrodes having the same diameter. Alternatively, the ducts and electrodes may have different diameters. In particular, the diameter of the duct or ducts housing electrodes that are connected operated at welding parameters which maintain an arc ignited and serving to transfer molten material from the electrode to the weld pool may be different than the duct or ducts housing electrodes which are operated at welding parameters, which ensure that the power generated is less than the power required to ignite and maintain an and continuously transfer molten electrode material from the electrode to the weld pool.

The third contact device 4 is retained in a recess 39 in a retainer 41 (FIG. 1).

As shown in FIG. 4*c*, a carrier 53 may be formed by a first, a second and a third plate 53*a*, 53*b*, 53*c* with a first insulating body 15 and a second insulating body 20 interposed in between. The plates 53*a*, 53*b*, 53*c* are secured to each other via insulating elements 61. The insulating elements 61 may be formed by a pipe of insulating material extending through the plates 53*a*, 53*b*, 53*c*. A screw 63 extends through the pipe of insulating material.

Referring to FIGS. 1 and 4*d*, the carrier 53 has a nose portion 65. First, second and third retainer elements 43*a*, 43*b*, 43*c* of the retainer 41 are attached to the nose portion 65. The first, second and third retainer elements 43*a*, 43*b*, 43*c* are separated by the insulating bodies 15 and 20. The first, second and third retainer elements 43*a*, 43*b* are connected via an insulating element 61. This insulating element 61 may be formed by an insulating pipe through which a screw 63 may extend. Preferably insulating washers of insulating material are used to insulate the side walls of the welding head from the screws.

As shown in FIG. 4*d*, the first retainer element 43*a* comprises a first part 43*a*1 having a jaw portion for securing a first contact plate 3*a* of the first contact device 3 and an attachment portion for securing the first part 43*a*1 to the carrier 53. The first retainer element 43*a* furthermore comprises a second part 43*a*2 having a jaw portion for securing a second contact plate 3*b* of the first contact device 3 and an attachment portion for securing the second part 43*a*2 to the carrier 53.

The first retainer element 43*a* has a first wall portion 45*a* facing the first contact plate 3*a* and a second wall portion 45*b* facing the second contact plate 3*b*. The first and second wall portions 45*a*, 45*b* are arranged in abutment with horizontal wall portions 47*a*, 47*b*, respectively, of the first contact device 3.

Similarly, the second retainer element 43*b* comprises a first part 43*b*1 having a jaw portion for securing a first contact plate 11*c* of the second contact device 11 and an attachment portion for securing the first part 43*b*1 to the carrier 53. The second retainer element 43*b* furthermore comprises a second part 43*b*2 having a jaw portion for securing a second contact plate 11*d* of the second contact device 11 and an attachment portion for securing the second part 43*b*2 to the carrier 53.

The second retainer element 43*b* has a first wall portion 45*c* facing the first contact plate 11*c* and a second wall portion 45*d* facing the second contact plate 11*d*. The first and second wall portions 45*c*, 45*d* are arranged in abutment with horizontal wall portions 47*c*, 47*d*, respectively, of the second contact device 11.

Likewise, the third retainer element 43*c* comprises a first part 43*c*1 having a jaw portion for securing a first contact plate 4*e* of the third contact device 4 and an attachment portion for securing the first part 43*c*1 to the carrier 53. The second retainer element 43*b* furthermore comprises a second part 43*c*2 having a jaw portion for securing a second contact plate 4*d* of the third contact device 4 and an attachment portion for securing the second part 43*c*2 to the carrier 53.

The third retainer element has a first wall portion 45*e* facing the first contact plate 4*e* and a second wall portion 45*d* facing the second contact plate 4*f*. The first and second wall portions 45*e*, 45*f* are arranged in abutment with horizontal wall portions 47*e*, 47*f* of the third contact device 4.

The first contact plate 3*a* of the first contact device 3 may be constituted by an essentially rectangular plate having a longitudinally extending recess 51*a*, which forms a portion of the duct 5 for the first electrode 2 and the second contact plate 3*b* may be constituted by an essentially rectangular plate having a longitudinally extending recess 51*b*, which forms a portion of the duct 5 for the first electrode 2.

In the same manner, the first contact plate 11*c* of the second contact device 11 may be constituted by an essentially rectangular plate having a longitudinally extending recess 51*c*, which forms a portion of the duct 13 for the second electrode 7 and the second contact plate 11*d* may be constituted by an essentially rectangular plate having a longitudinally extending recess 51*d*, which forms a portion of the duct 13 for the second electrode 7.

The third contact plate 4*e* of the third contact device 4 may be constituted by an essentially rectangular plate having a longitudinally extending recess 51*e*, which forms a portion of the duct 6 for the third electrode 8 and the second contact plate 4*f* may be constituted by an essentially rectangular plate having longitudinally extending recess 51*f*, which forms a portion of the duct 6 for the third electrode 8.

The first and second contact plates 3*a*, 3*b*, 4*a*, 4*b*, 11*a* and 11*b* of the first, second and third contact devices 3, 4, 11 may be biased against each other by spring action.

The first and second retainer elements 43*a, b* are separated by an insulating body 15 and the first and third retainer elements 43*a, c* are separated by an insulating body 20.

The welding head may comprise any number of retainer elements separated by insulating bodies.

FIG. 4*a* relates to the embodiment of the welding head 1 arranged to receive two electrodes 2, 7 and shows a cross section taken at A-A in FIG. 1. The figure shows a first and a second plate element 53*a*, 53*b*, which form part of the carrier 53 and are separated by an insulating body 15. The first and second plate elements 53*a*, 53*b* each house a duct 5, 13 for an electrode 2, 7. The insulating body 15 may be monolithic or be made by two parts where recesses are formed to create a duct 19. The first plate element 53*a*, the second plate element 53*b* and the insulating body 15 are united by an insulating member 61.

FIG. 4c relates to the embodiment of the welding head 1 arranged to receive three electrodes 2, 7, 8 and shows a cross section taken at A-A in FIG. 1. The figure shows a first, a second and a third plate element 53a, 53b, 53c, which form part of the carrier 53 and are separated by insulating bodies 15 and 20. The first, second and third plate elements 53a, 53b, 53c each house a duct 5, 13, 6 for an electrode 2, 7, 8. The first plate element 53a, the second plate element 53b, the third plate element 53c and the insulating bodies 15, 20 are united by an insulating member 61.

Figure 5:
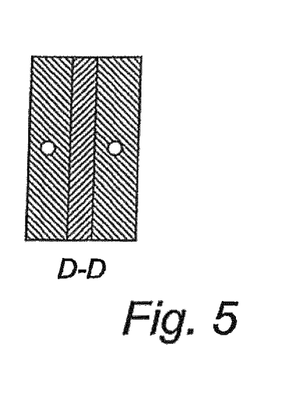
FIG. 5 shows a cross-section taken at D-D in FIG. 2.

In FIG. 5 is shown a cross-section taken at D-D in FIG. 2. Here the first plate element 53a with a first duct 5 for an electrode 2, the second plate element 53b with a second duct 13 for an electrode 7 and an insulating body 15 are shown.

Figure 6:
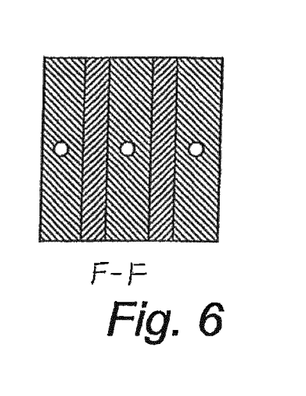
FIG. 6 shows a cross-section taken at F-F in FIG. 3.

In FIG. 6 is shown a cross-section taken at F-F in FIG. 3. Here the first plate element 53a with a first duct 5 for an electrode 2, the second plate element 53b with a second duct 13 for an electrode 7, the third plate element 53c with a third duct 6 for an electrode 8 and two insulating bodies 15, 20 separating said plate elements 53a, 53b, 53c are shown.

Figure 7:
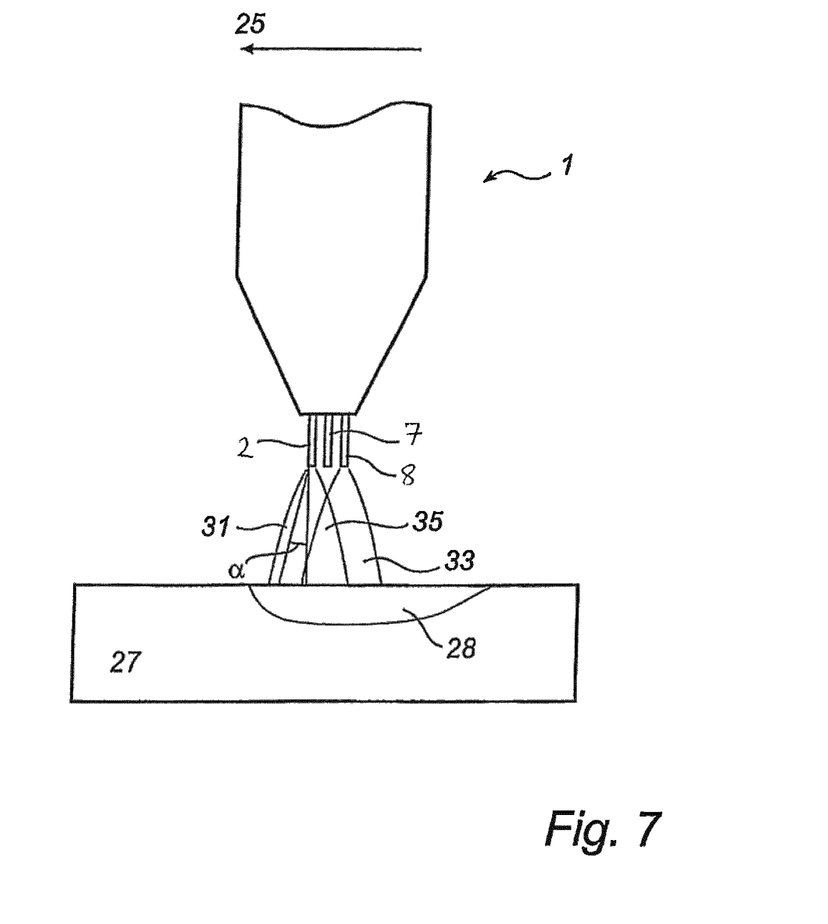
FIG. 7 shows a welding head arranged for welding a work piece.

FIG. 7 shows a side view of a welding head 1. The welding head 1 is arranged for welding a work piece 27. The welding head 1 propagates in a welding direction as indicated by arrow 25. The welding head 1 is of similar construction to the welding head 1 shown in FIG. 3. However, the first and third electrodes 2, 8 in FIG. 7 are hot wires adapted to produce arcs without the assistance of adjacent electrodes. Each arc is formed between the tip of an electrode 2, 8 and the work piece 27. The second electrode 7 is a semi-hot wire located in between said first and third electrodes 2, 8. The second electrode 7 is unable to produce an arc unless it consumes excess energy from said first and/or third electrodes.

In arc welding, an arc is present between the tip of an electrode 2, 8 and a work piece 27. The contact point of the arc at the work piece 27 will be moving in a random manner. However, normally it is assumed that the arc is present within a cone shaped or parabolic arc region 31, 33 from the tip of the consumable electrode 2, 8 to the work piece 27. The opening angle of the cone 31, 33 may vary from welding case to welding case. However, a normal opening angle $\alpha$ may be around 30°.

The second electrode 7 is in FIG. 7 arranged in between the first and third electrodes 2, 8. This arrangement is preferred, but not necessary. The first and third consumable electrodes 2, 8 are preferably mounted at an axial distance being less than a cone diameter of an arc cone 31, 33 measured at the surface of a weld pool 28. The second electrode 7 is preferably introduced into the outer parts of the overlapping portions 35 of the arc cones 31, 33 of the first and third electrodes 2, 8, which is beneficial for the weld result.

In preferable embodiments the feeding arrangement is arranged to feed said second electrode 7 at an angle of preferably less than 5 degrees, still preferably less than 2 degrees, with respect to a weld 28 surface normal.

In a preferred embodiment, the consumable electrodes 2, 8 are arranged in parallel and are arranged to be fed toward the weld pool 28 in an essentially orthogonal direction to a surface of the weld pool 28.

Each arc is present within an essentially cone shaped or parabolic arc region 31, 33 extending between an electrode 2, 8 tip and the work piece 27. Each cone shaped or parabolic arc region 33 defines a plasma region in which the arc plasma will be present when welding. The cone 31, 33 will have an opening angle $2\alpha$, which is dependent on the distance between the work piece 27 and the electrode tip and the voltage between the electrode 2, 8 and the work piece 27. The first and third electrodes 2, 8 are positioned in the vicinity of each other such that an overlapping region 35 between the plasma region 31 of the first electrode 2 and the plasma region 33 of the third electrode 8 is created. In order to accomplish this, the first and third ducts 5, 6 of the welding head 1 are arranged at a distance which allows for arcs between said first and second electrodes 2, 8 and the work piece 27 to be welded to have an overlapping region 35.

The second electrode 7 is fed into the overlapping region 35.

In preferred embodiments, in order to enable creation of an overlapping region 35 suitable for receiving the second electrode 7, a distance between a center of the second and first ducts 13, 5 may be less than 3 times the diameter of the first duct 5. Further, a distance between a center of the second and third ducts 13, 6 may be less than 3 times the diameter of the third duct 6.

Figure 8:
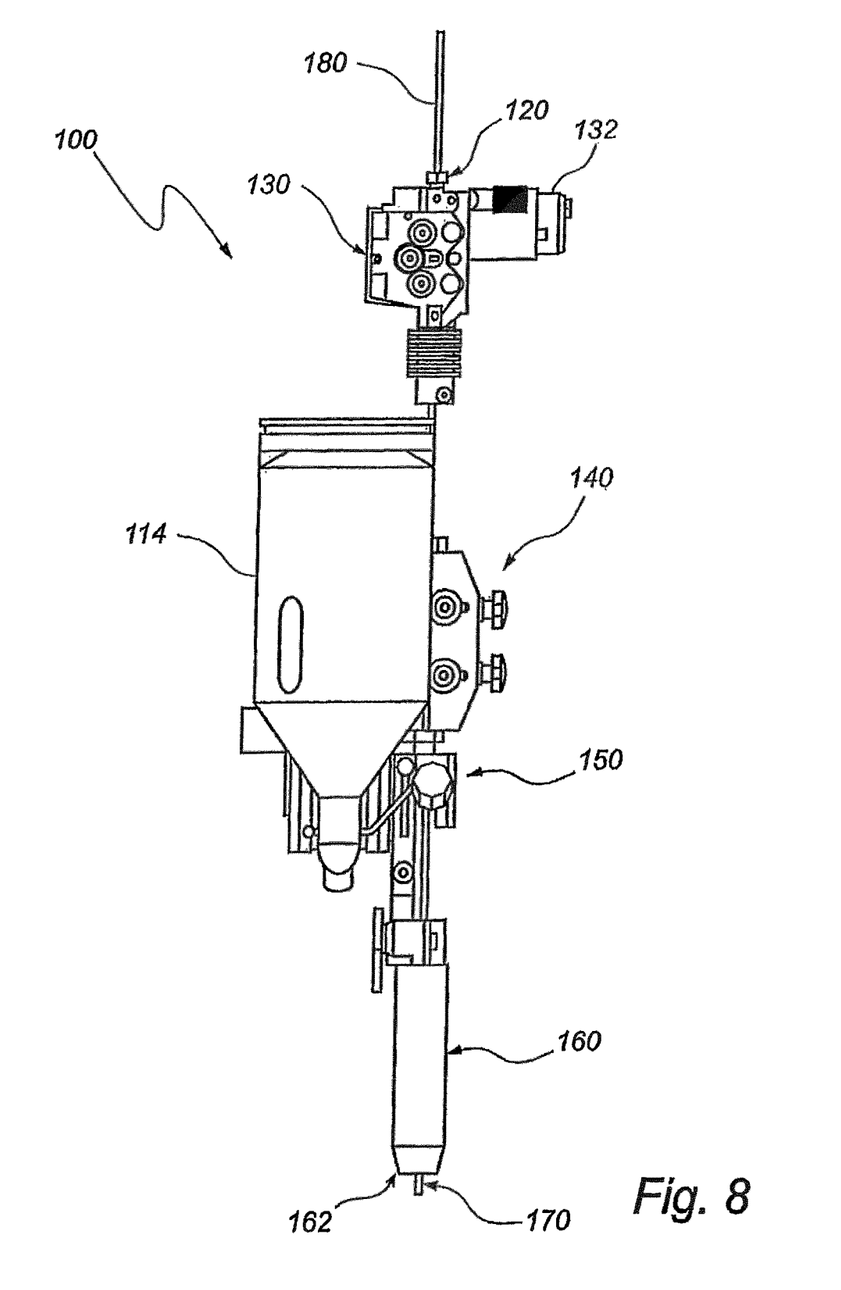
FIG. 8 shows a view of an embodiment of an arc-welding welding arrangement for submerged arc welding.
Figure 9:
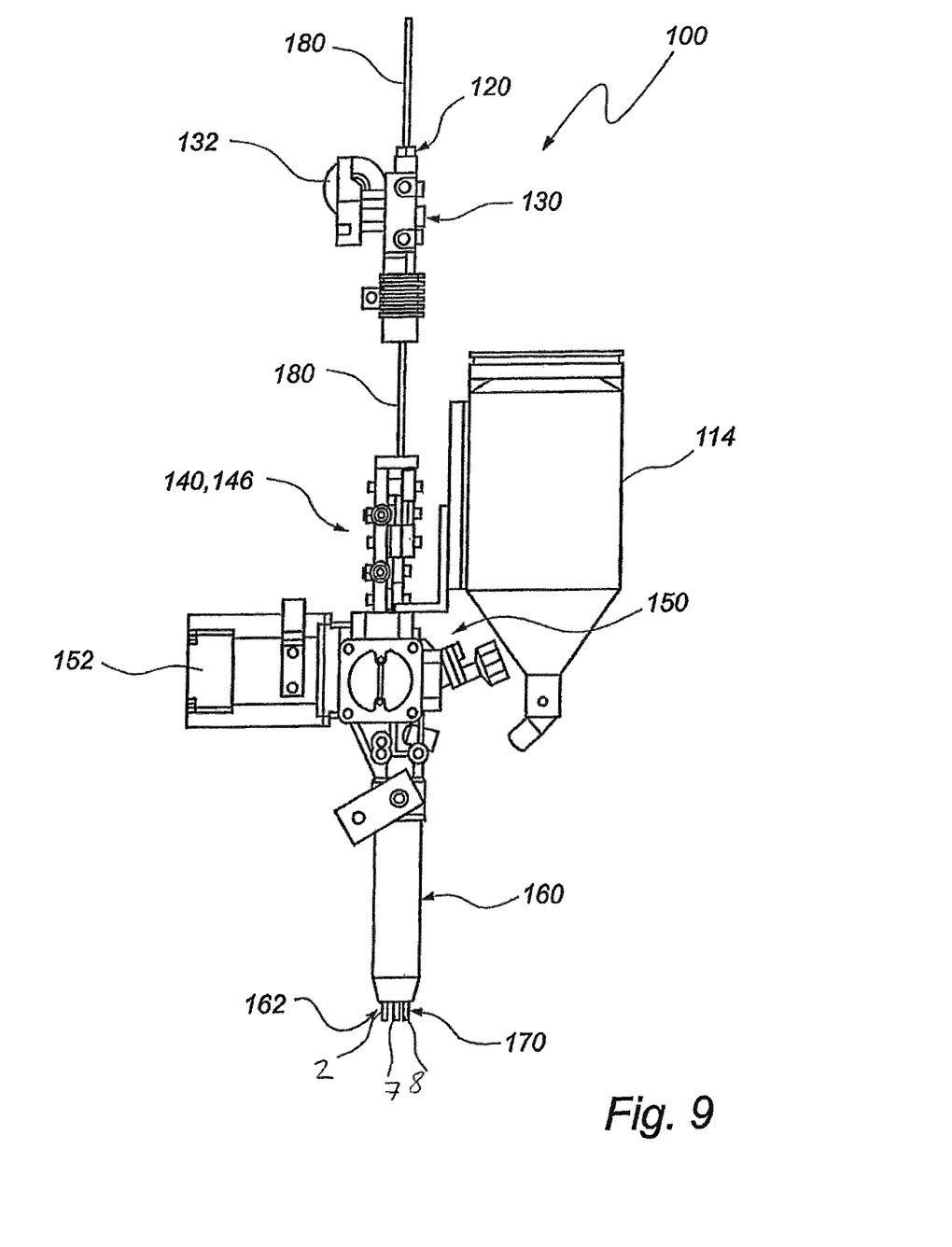
FIG. 9 shows the arc-welding welding arrangement of FIG. 8 turned counterclockwise by 90°.
Figure 10:
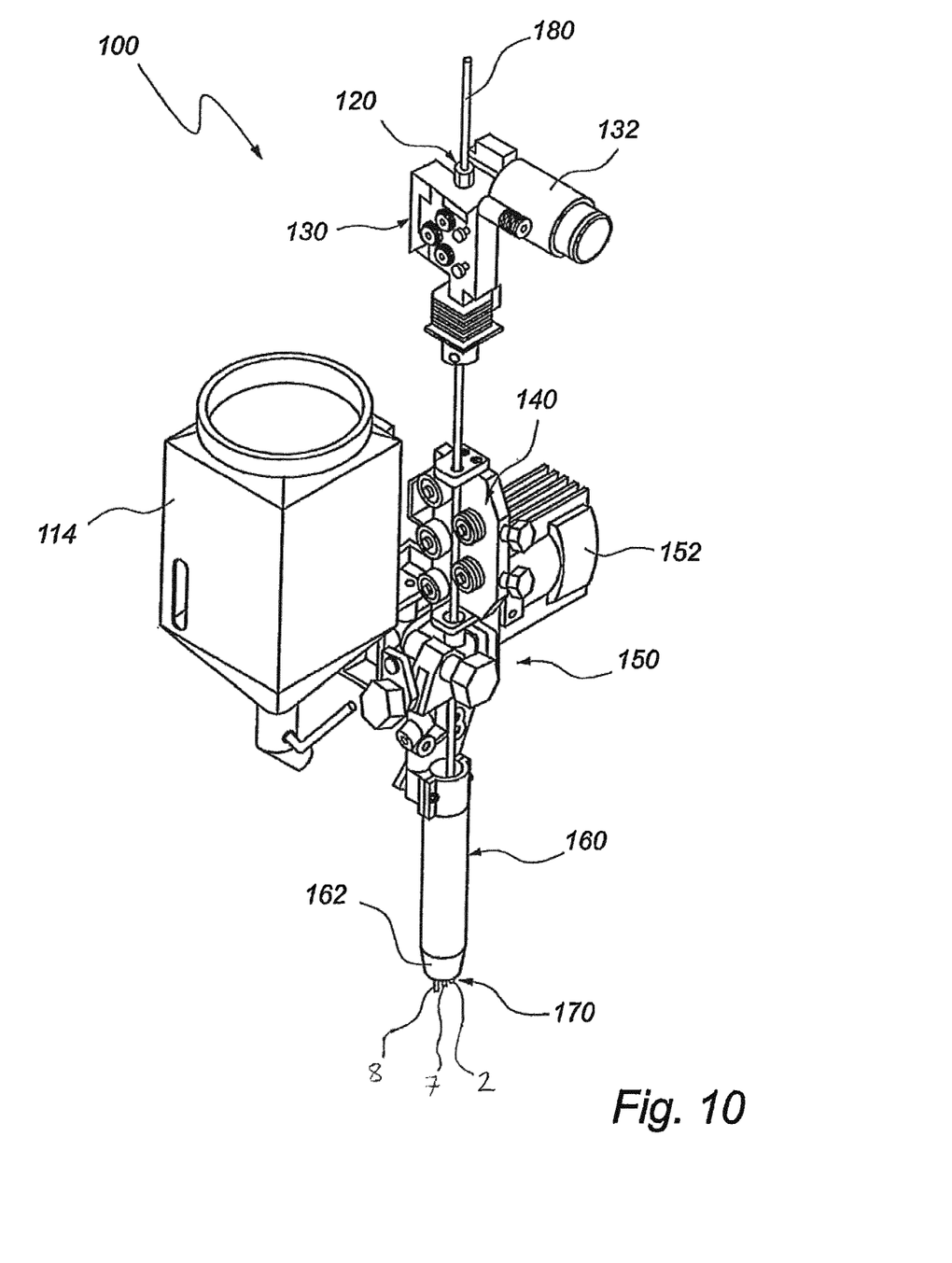
FIG. 10 shows a perspective view or the arc-welding arrangement of FIG. 8.

FIGS. 8 to 10 depict different views of an example embodiment of an electric arc-welding welding arrangement 100 for submerged arc welding which views are described in combination.

Along its longitudinal extension the electric arc-welding welding arrangement 100 comprises an arc welding head 160 at its lower end, which arc welding head 160 during welding is in close proximity to the work piece (not shown) to be welded. The arc welding head 160 is of the type as described in connection to FIGS. 1-7 and holds the electrodes 2, 7, 8 of the electrode assembly 170 of the welding arrangement 100. The electrodes 2, 7, 8 exit the arc welding head 160 through outlets 162 at the lower end of the arc welding head 160, which faces the work piece during the welding operation. The wire electrodes 2, 7, 8 may be fed from respective reservoirs such as coils (not shown) towards the arc welding arrangement 100.

The electrode assembly 170 comprises by way of example three fusible continuously-fed wire electrodes 2, 7, 8 arranged in the arc welding head 160. The continuously fed wire electrodes 2, 7, 8 are electrically isolated from each other.

A wire feeder unit 150 is arranged above the arc welding head 160 to feed an electrode towards said arc welding head. Typically, the feeder unit 150 comprises grooved wheels, which move the wire electrode or the cold wire towards the arc welding head 160. The feeder unit 150 may be arranged for feeding one or both of the first and third electrodes 2, 8 or the second electrode 7 or all electrodes 2, 7, 8. In the event the feeder unit 150 feeds more than a single electrode 2, 7, 8, the feeder unit 150 will typically comprise electrically insulating portions for feeding through each respective electrode 2, 7, 8 such that at least the electrodes 7 unable to produce arcs on their own are electrically insulated from the electrodes 2, 8 being able to produce arcs on their own. The electrically insulating portions can consist of feeder wheels with an extra insulated groove for the electrically insulated electrodes 7.

The feeder wheels are driven by a driving unit 152, e.g. an electric motor. Aside from the wire feeder unit 150 a flux hopper 114 is arranged which feeds granular flux to the arc welding head 160 via a nozzle (not shown) for submerged arc welding. Besides the driving unit 152 the wire feeder unit 150 comprises a gear with a drive shaft. On the drive shaft of the gear a feeding wheel is arranged which can be pressurized by another wheel. The feeding wheel drives the electrode 2, 7, 8 forward in the direction of the arc welding head 160.

A wire straightening unit 140 is arranged above the wire feeder unit 150. Two rollers depicted in a foremost position of the wire straightening unit 140 are used to exert a pressure on three fixed wheels arranged vertically one over the other in the rear part of the straightening device. The pressure the rollers are exerting on the wheels is adjustable via knobs at the outside of the wire straightening unit 140. The pressure of the rollers on the three wheels is straightening the wire(s). The wire straightening unit 140 may comprise electrically insulating portions adapted to separate electrodes 2, 7, 8 from each other.

Instead of having a single wire feeding unit 150 for all electrodes, separate wire feeder units can be used for each of the electrodes. In FIGS. 8-10 a separate feeder unit 130 is provided for feeding the second electrode 7 towards the arc welding head 160. On the wire feeder unit 130 a driving unit 132, e.g. an electric motor, is arranged which drives feeder wheels of the wire feeder unit 130. Besides the driving unit 132, the wire feeder unit 130 comprises a gear with a drive shaft. On the drive shaft of the gear a feeding wheel is arranged which can be pressurized by another wheel. The feeding wheel drives the second electrode 7 forward in the direction of the arc welding head 160.

Instead of having a single wire straightening unit 140, separate wire straightening units may be arranged for straightening the individual electrodes. Here a single wire straightening unit 120 for the second electrode 7 is shown. In this embodiment, along the longitudinal extension of the welding head 100, an electrically insulating conduit 180 is provided for guiding the second electrode 7 from a wire reservoir such as a wire bobbin to the contact nozzle. The electrically insulating duct 180 consists of the electrically insulating portion of the wire straightening unit 140, the electrically insulating portion of the wire feeder unit 150, and an electrically insulated portion of the arc welding head 160 as well as electrically insulated wire conduits between and the units 130, 140, 150, 160 and above the wire straightening unit 120 for the second electrode 7.

Figure 11:
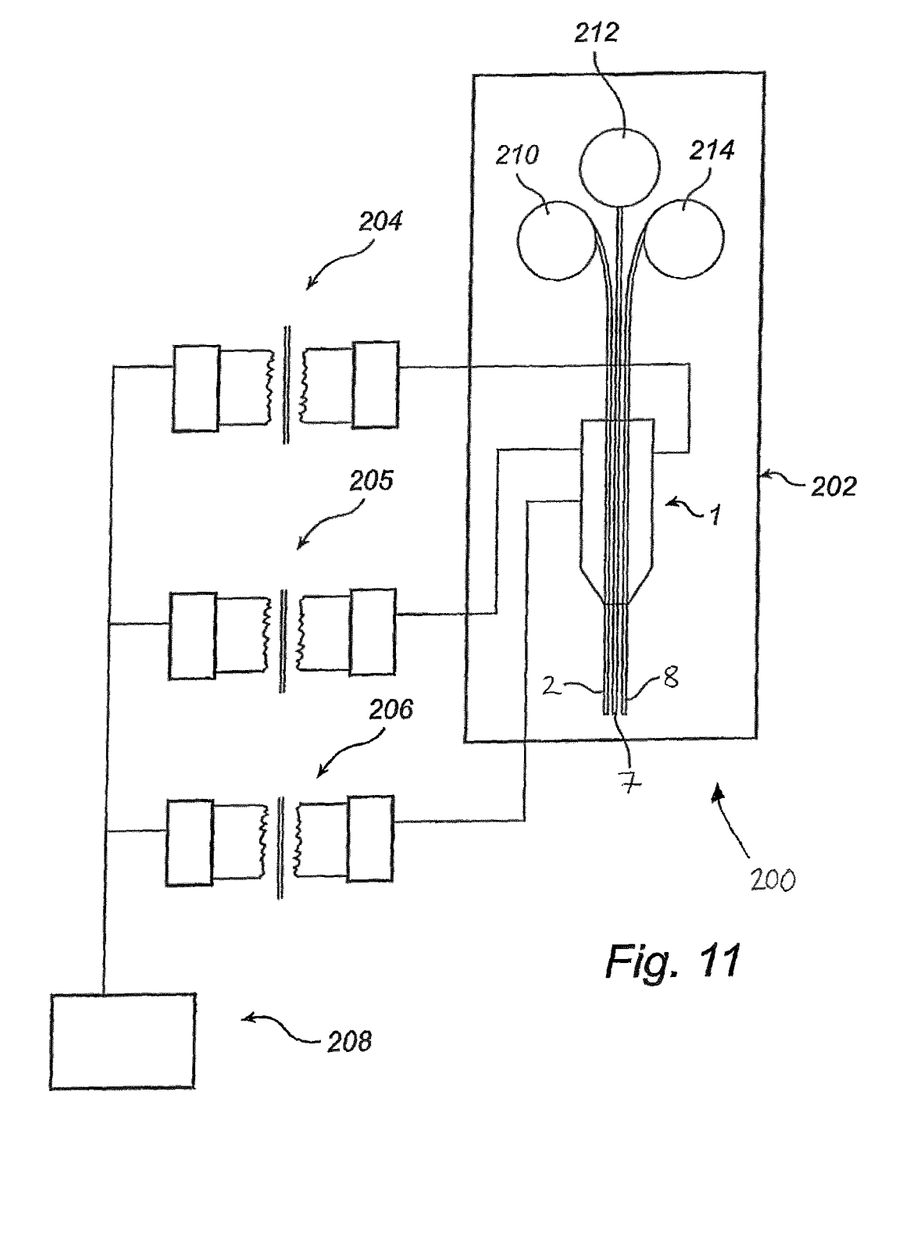
FIG. 11 shows an arc welding system.

FIG. 11 shows an arc welding system 200 comprising an arc welding arrangement 202 as shown in FIGS. 8-10. The arc welding arrangement 202 comprises an arc welding head 1 according to the invention. The arc welding arrangement 202 further comprises three separate power sources 204, 205, 206, which are controlled by a controller 208. The power sources may be of the inverter type, for example such as described in U.S. Pat. No. 6,291,798. The arc welding system comprises a first wire feeder 210 for feeding a first consumable electrode 2, a second wire feeder 212 for feeding a second consumable electrode 7 and a third wire feeder 214 for feeding a third consumable electrode 8. The first power source 204 is connected to a first contact device for providing electrical contact between the first power source 204 and the first electrode 2. The second power source 205 is connected to a second contact device for providing electrical contact between the second power source 205 and the second electrode 7. The third power source 206 is connected to a third contact device for providing electrical contact between the third power source 206 and the third electrode 8. The first power source 204 is operated to maintain a first arc ignited and transfer molten metal from said first electrode to the weld pool. The third power source 206 is operated to maintain a third arc ignited and transfer molten metal from said third electrode 8 to the weld pool. The second power source 205 is operated to ensure that the second electrode 7 on its own cannot generate a second arc.

The semi-hot second electrode 7 is moved into the overlapping arc region of the two adjacent first and third hot wires 2, 8 to consume excess energy from said hot wires 2, 8 in such amounts that an arc is generated at said second electrode 7 and melted electrode material is transferred from the second electrode 7 to the work piece.

In an alternative embodiment, an electrode operated at welding parameters which maintain an arc ignited between said electrode and a work piece may be located in between two electrodes operated at welding parameters such that said electrodes cannot on their own generate arcs between the said electrodes and the work piece.

The scope of protection is not limited to the above described embodiments. The above described embodiments can be amended and combined in many different ways without parting from the scope of the invention. For example, the welding head 1 in FIG. 1 can comprise more than three electrodes, the first and third electrodes in FIG. 11 can be connected to the same power source.

The invention claimed is:

1. An electric arc welding method to be used with an arc welding arrangement, the welding arrangement comprising:
   a first power source,
   a first wire feeder for feeding a first electrode,
   a second wire feeder for feeding a second electrode,
   an electric arc welding head comprising:
      a first contact device housing a first duct for guiding the first electrode and providing electrical contact between the first power source and the first electrode, and
      a second contact device housing a second duct for guiding the second electrode and providing power to the second electrode,
      the first and second contact devices being electrically insulated from each other, the first electrode being adapted to act on a work piece for generating a weld pool via a first electric arc present between the first electrode and the work piece within a first arc region and the second electrode being adapted to act on the work piece for generating the weld pool via a second electric arc present between the second electrode and the work piece within a second arc region,
   the method comprising:
      operating the first electrode at welding parameters adapted to maintain the first electric arc ignited and to transfer molten electrode material from the first electrode to the weld pool;
      operating the second electrode at welding parameters adapted to ensure that excess energy from the first electrode maintains the second electric arc ignited and to transfer molten electrode material from the second electrode to the weld pool; and
      feeding the second electrode so that the second electrode consumes excess energy from the first electrode to ignite and maintain the second electric arc ignited and to transfer molten electrode material from the second electrode to the weld pool.

2. The method of claim 1, wherein the first and second electrodes are both powered by the first power source.

3. The method of claim 1, wherein the first and second electrodes are powered by different power sources.

4. The method of claim 1, wherein the arc welding head further comprises a third contact device housing a third duct for guiding a third electrode and providing electrical power to the third electrode, the third electrode adapted to act on the work piece for generating the weld pool via a third electric arc present between the third electrode and the work piece within a third arc region, wherein the first and third electrodes are fed to allow the first and third arc regions to form an overlapping region, wherein the third electrode is operated at welding parameters adapted to maintain the third electric arc ignited and transfer molten metal from the third electrode to the weld pool, and the method further comprising:

feeding the second electrode so that it consumes excess energy from the first and third electrodes to ignite and maintain the second electric arc ignited and to transfer molten electrode material from the second electrode to the weld pool.

5. The method of claim 4, wherein the first and third electrodes are both powered by the first power source.

6. The method of claim 4, wherein the first and third electrodes are powered by different power sources.

7. The method of claim 4, wherein a wire feed speed of the second electrode is controlled in dependence on at least one of the welding parameters of the first electrode and the welding parameters of the third electrode.

8. The method of claim 4, wherein a wire feed speed of the second electrode is controlled in dependence on at least one of a wire feed speed of the first electrode and a wire feed speed of the third electrode.

9. The method of claim 1, wherein the current, voltage and wire feed speed of the first or second electrode are selectable independently of one another.

10. The method of claim 1, wherein the first electrode is a hot wire electrode and the second electrode is a semi-hot wire electrode.

11. The method of claim 1, wherein the feeding further comprises:

feeding the second electrode into the first arc region.

\* \* \* \* \*